United States Patent
Peyron

(10) Patent No.: US 7,290,403 B2
(45) Date of Patent: Nov. 6, 2007

(54) METHOD AND INSTALLATION FOR ENERGY PRODUCTION BY MEANS OF A GAS TURBINE ASSOCIATED WITH AN AIR SEPARATION UNIT

(75) Inventor: Jean-Marc Peyron, Creteil (FR)

(73) Assignee: L'Air Liquide, Société Anonyme á Directoire et Conseil de Surveillance pour l'Etude et l'Exploitation des Procédés George Claude, Paris (FR)

( * ) Notice: Subject to any disclaimer, the term of this patent is extended or adjusted under 35 U.S.C. 154(b) by 616 days.

(21) Appl. No.: 10/480,175

(22) PCT Filed: Jun. 7, 2002

(86) PCT No.: PCT/FR02/01951

§ 371 (c)(1),
(2), (4) Date: Dec. 8, 2003

(87) PCT Pub. No.: WO02/101216

PCT Pub. Date: Dec. 19, 2002

(65) Prior Publication Data

US 2004/0168468 A1    Sep. 2, 2004

(30) Foreign Application Priority Data

Jun. 8, 2001    (FR) .................................. 01 07544

(51) Int. Cl.
*F25J 1/00*    (2006.01)
(52) U.S. Cl. ........................................ 62/656; 60/39.24
(58) Field of Classification Search .................. 62/656, 62/644, 648, 643, 653, 772; 700/270; 60/39.24
See application file for complete search history.

(56) References Cited

U.S. PATENT DOCUMENTS

| | | | |
|---|---|---|---|
| 5,224,336 A * | 7/1993 | Agrawal et al. | 62/656 |
| 5,386,686 A | 2/1995 | Chretien et al. | |
| 5,410,869 A | 5/1995 | Muller | |
| 5,431,023 A * | 7/1995 | Howard et al. | 62/656 |
| 5,501,078 A | 3/1996 | Paolino | |
| 5,666,825 A * | 9/1997 | Darredeau et al. | 62/656 |
| 5,802,875 A | 9/1998 | Drnevich | |
| 5,901,547 A * | 5/1999 | Smith et al. | 60/773 |
| 2002/0017113 A1* | 2/2002 | Seiver et al. | 62/656 |

FOREIGN PATENT DOCUMENTS

| | | |
|---|---|---|
| EP | 0 773 416 | 5/1997 |
| EP | 0 959 314 | 11/1999 |
| GB | 2 331 128 | 5/1999 |

OTHER PUBLICATIONS

International Search Report for PCT/FR02/01951.

* cited by examiner

*Primary Examiner*—Mohammad M. Ali
(74) *Attorney, Agent, or Firm*—Elwood L. Haynes

(57) ABSTRACT

A method which include an air intake into an air separation unit; extracting from the separation unit at least a gas stream, essentially consisting of an air gas, in particular oxygen or nitrogen, and directing one or more of these gas streams towards the combustion chamber of a gas turbine; controlling at least one parameter related to the or each gas stream, by acting on a compressor in each gas stream arranged downstream of the air separating unit; assigning to one or more parameter a variable setpoint value, based on a value representing the load of the gas turbine.

5 Claims, 2 Drawing Sheets

METHOD AND INSTALLATION FOR ENERGY PRODUCTION BY MEANS OF A GAS TURBINE ASSOCIATED WITH AN AIR SEPARATION UNIT

BACKGROUND OF THE INVENTION

1. Field of the Invention

The present invention relates to a method and to an installation for producing energy by means of a gas turbine associated with an air separation unit.

2. Related Art

In a conventional way, a gas turbine comprises a compressor, a combustion chamber, and an expansion turbine, coupled to the compressor to drive the latter. This combustion chamber receives a combustion gas, together with a certain amount of nitrogen whose purpose is to lower the flame temperature in this combustion chamber to make it possible to minimize the emissions of nitrogen oxides to the atmosphere.

In a known way, the combustion gas can be obtained by gasification, namely by oxidation of carbon-containing products, such as coal or alternatively residues from the petroleum industry. This oxidation is performed in an independent unit known as a gasifier.

In a conventional way, it is possible to associate this gas turbine with an air separation unit. The latter, which is usually a cryogenic unit comprising at least one distillation column, is able to supply, from air, at least one gaseous stream consisting predominantly of one of the gases in the air, particularly oxygen or nitrogen.

Combining this air separation unit with the gas turbine consists in making good use of at least one of the two aforesaid gaseous streams. For this, the oxygen and nitrogen produced in the air separation unit are admitted into the gasifier and into the combustion chamber respectively.

U.S. Pat. No. 5,501,078 and EP-A-0 773 416 describe methods in which the pressures of the gases compressed by the oxygen and nitrogen compressors are constant.

U.S. Pat. No. 5,802,875 has no means for acting directly on the nitrogen compressor but a valve downstream thereof which acts indirectly on the compressor to alter the nitrogen flow rate.

SUMMARY OF THE INVENTION

The invention proposes to employ a method of this type, in a way that is particularly economical, particularly in terms of power requirement.

To this end, its subject is a method for producing energy using a gas turbine associated with an air separation unit, in which method air is admitted into said separation unit, at least one gaseous stream essentially consisting of a gas from the air, which is of oxygen or of nitrogen is extracted from said separation unit, and the gaseous stream is directed toward a combustion chamber of the gas turbine, in the case of nitrogen, or toward a gasifier in the case of oxygen, characterized in that at least one parameter associated with the or each gaseous stream is controlled by direct action on a compressor for this gaseous stream which is located downstream of said air separation unit, and in that a variable setpoint value that varies as a function of a value representative of the load on the gas turbine is assigned to the or each parameter.

BRIEF DESCRIPTION OF THE DRAWINGS

For a further understanding of the nature and objects for the present invention, reference should be made to the following detailed description, taken in conjunction with the accompanying drawings, in which like elements are given the same or analogous reference numbers and wherein.

Figure 1:
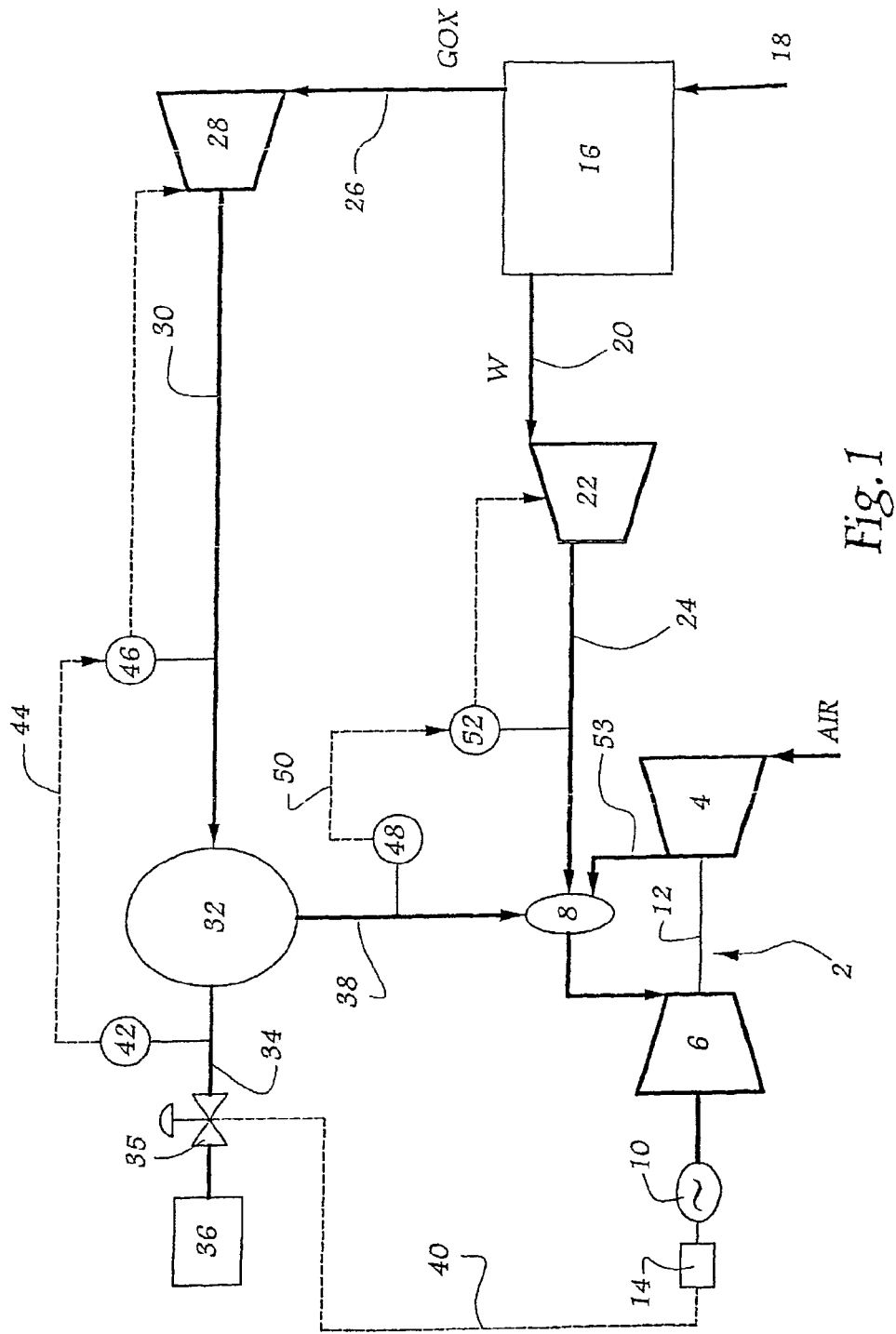
FIG. 1 illustrates a first embodiment of the invention.

The compressor can be acted upon directly by altering the compressor vanes or by altering the speed of the turbine driving it.

DESCRIPTION OF PREFERRED EMBODIMENTS

According to other features of the invention:
- the parameter associated with said or with at least one of said gaseous streams is the flow rate;
- the gaseous stream is essentially formed of oxygen, this oxygen is admitted into a gasifier that also receives carbon-containing products, and the value representative of the load on the turbine is the flow rate of carbon-containing products admitted into the gasifier;
- the gaseous stream is essentially formed of nitrogen, this stream is admitted into the combustion chamber, and the value representative of the load on the turbine is the flow rate of fuel gas admitted into this combustion chamber: as a preference, there is no regulating valve between the compressor and the combustion chamber;
- no control of the nitrogen pressure is exerted at the compressor;
- the parameter associated with said or with at least one of said gaseous streams is the pressure;
- the value representative of the load on the turbine is a specific pressure value on the intake side of the gas turbine, particularly in a delivery circuit running between a compressor coupled to said turbine and the combustion chamber;
- the gaseous stream is essentially formed by nitrogen and a first setpoint value equal to said particular pressure increased by a first safety value is assigned to the pressure of this stream;
- the first safety value is between 0.1 and 10 bar, particularly between 0.3 and 2 bar;
- the gaseous stream is essentially formed of oxygen, and a second setpoint value equal to said particular pressure increased by a second safety value is assigned to the oxygen pressure;
- the second safety value is between 2 and 20 bar, particularly between 3 and 10 bar;
- the pressure inside a gasifier feeding the combustion chamber with fuel gas is also controlled by assigning to it a variable setpoint point that varies as a function of said particular pressure value;
- the setpoint value is equal to said particular pressure, to which a third safety value is added;
- the third safety value is between 0.5 and 10 bar, particularly between 1 and 5 bar.

Another subject of the invention is an installation for producing energy by means of a gas turbine associated with an air separation unit, this installation comprising means allowing at least one gaseous stream essentially consisting of a gas from the air, which is of oxygen or of nitrogen to be extracted from the separation unit, and means for conveying the gaseous stream toward a combustion chamber of the gas turbine in the case of nitrogen or toward a gasifier in the case of oxygen, characterized in that control means are provided for controlling at least one parameter associated with the or with each gaseous stream, these means being able to act directly on a compressor for this gaseous stream, said control means having a variable setpoint value that varies as a function of a value representative of the load on the gas turbine.

According to other features of the invention:

the control means are means for controlling the flow rate;

the control means are able to control the flow rate of oxygen flowing along a line emerging into a gasifier intended to feed the combustion chamber, this gasifier also being placed in communication with a line for conveying carbon-containing products, and means are provided for controlling the flow rate of the carbon-containing products admitted to the gasifier, these means being able to control the means for controlling the oxygen flow rate;

the control means are able to control the flow rate of a stream of nitrogen flowing along a pipe opening into the combustion chamber, also placed in communication with a pipe for conveying fuel gas, and means are provided for controlling the flow rate of fuel gas, these means being able to control the means for controlling the flow rate of the stream of nitrogen;

the control means are means for controlling the pressure of said or at least one of said gaseous streams;

measurement means are provided for measuring a particular pressure value on the inlet side of the gas turbine, particularly in a delivery circuit running between a compressor coupled to the turbine and the combustion chamber, and operating means are also provided so that the means for controlling the pressure can be slaved to said measurement means;

means are also provided for controlling the pressure of the gasifier, together with operating means allowing these control means to be slaved to the measurement means.

Figure 2:
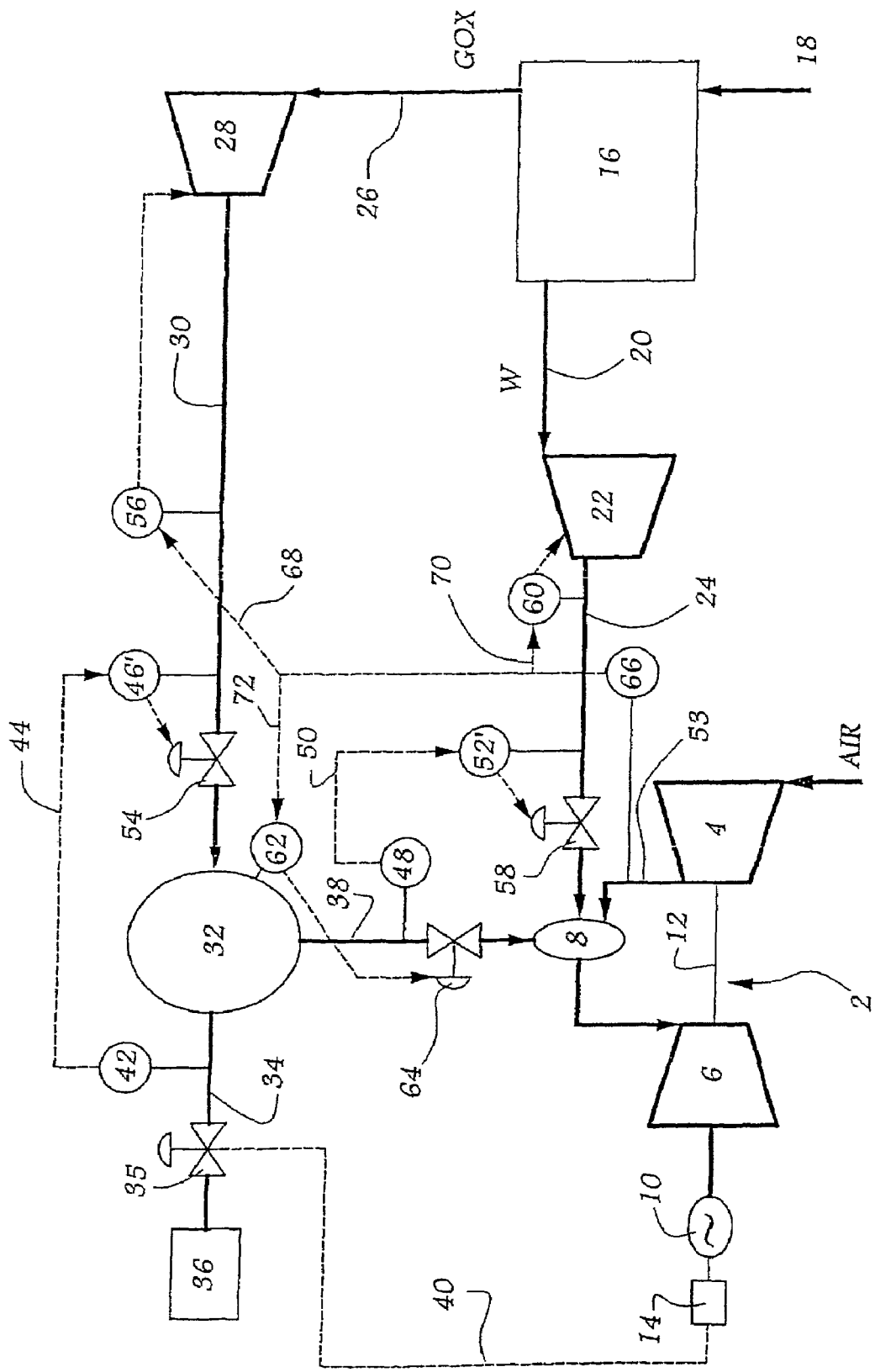
FIG. 2 illustrates a second embodiment of the invention.

The invention will be described hereinafter with reference to the attached drawings which are given solely by way of nonlimiting examples, in which FIGS. 1 and 2 are schematic views illustrating installations according to two embodiments of the invention.

In these figures, lines drawn in bold are for conveying fluids, whereas lines drawn in dotted line are control lines.

The installation depicted in FIG. 1 comprises a gas turbine, denoted overall by the reference 2 and which comprises, in the conventional way, an air compressor 4, an expansion turbine 6 coupled to the compressor 4, and a combustion chamber 8.

This gas turbine 2 is also provided with an alternator 10, driven by a shaft 12 common to the compressor 4 and to the turbine 6. A device for measuring the load on the gas turbine, that is to say for measuring the demand for power associated with it, is illustrated by a box 14, placed near the alternator 10.

The installation of FIG. 1 also comprises an air separation unit denoted overall by the reference 16. The latter, which is of known type, is supplied with air by a pipe 18. It operates cryogenically, and for this purpose has several distillation columns, not depicted.

A line 20 is able to remove, from the unit 16, a first stream W of residual nitrogen (nitrogen containing a few % of oxygen). This line 20 opens into a compressor 22 downstream of which there is a pipe 24 opening into the combustion chamber 8.

Furthermore, a line 26 is able to remove, from the unit 16, an oxygen-rich gaseous stream GOX. This line 26 opens into a compressor 28 downstream of which there is a pipe 30.

The latter opens into a gasifier 32, of conventional type, which is also supplied, via a line 34 equipped with a regulating valve 35, by a reservoir 36 containing carbon-containing products, such as coal.

A pipe 38, which runs downstream of the gasifier 32, conveys the fuel gas resulting from the oxidation of the aforesaid carbon-containing products. This pipe 38 is placed in communication with the combustion chamber 8 of the gas turbine.

The device 14 for measuring the load is connected to the valve 35, by a command line 40. What this means, in other terms, is that an increase in the load 14 entails an increase in the flow rate of carbon-containing products conveyed in the line 34. Furthermore, the latter is provided with a device 42 for controlling the flow rate, which is placed in communication, via a command line 44, with a device 46 for controlling the oxygen flow rate in the pipe 30.

Finally, the pipe 38 is equipped with a device 48 for controlling the flow rate of the fuel gas flowing therein. The device 48 is placed in communication, via a command line 50, with a device 52 for controlling the flow rate of residual nitrogen flowing in the pipe 24.

The overall operation of the installation of FIG. 1 will now be described.

A certain flow rate of carbon-containing products is admitted to the gasifier 32 via the line 34 as a function of the load on the gas turbine. Oxygen is also admitted to the gasifier, so as to produce a fuel gas, delivered by the pipe 38. There is a predetermined combustion ratio R1 between the respective flow rates of carbon-containing products and oxygen.

The fuel gas conveyed by the pipe 38 opens into the combustion chamber 8 of the gas turbine. This combustion chamber also receives residual nitrogen, from the pipe 24. The dilution ratio corresponding to the ratio between the flow rates of fuel gas and of residual nitrogen is termed R2.

The combustion chamber 8 also receives, via a pipe 53, compressed air from the compressor 4. The gases resulting from the corresponding combustion, mixed with residual nitrogen, are sent to the inlet side of the expansion turbine 6, where they expand, driving this turbine. This also, via the shaft 12, drives the compressor 4 and the alternator 10 which powers, for example, an electricity distribution network, not depicted.

When the load on the gas turbine 2 varies, this causes a corresponding variation in the flow rate of carbon-containing products flowing along the line 34. This flow rate is controlled via the device 42 which then, via the line 44, sends a command to the control device 46, so that the flow rate of oxygen in the pipe 30 is adjusted accordingly, so that the combustion ratio R1 is maintained.

The device 46 for controlling the flow rate acts directly on the compressor 28 in a way known per se, for example on the vanes thereof. It should be noted that no pressure control is performed on the outlet side of this compressor 28. Furthermore, there is no valve needed on the pipe 30.

Thus, the pressure of oxygen flowing through the pipe 30 becomes established spontaneously, as a function in particular of the characteristic of the gas turbine, and that of the compressor 28.

The flow rate of oxygen flowing through the pipe 30 is therefore assigned a variable setpoint value that varies as a function of the flow rate of carbon-containing products conveyed by the line 34, the latter flow rate being itself commanded via the load on the turbine and therefore representative of this load.

Furthermore, when there is such a variation in load, the flow rate of fuel gas flowing in the pipe 38 varies accordingly, because of the variations in the flow rates of the carbon-containing products and oxygen. The flow rate of the fuel gas is controlled via the device 48 which then sends, via the line 50, a command to the device 52 so that the latter controls the flow rate of residual nitrogen flowing along the line 24 so that the ratio R2 is maintained. The control device 52 acts directly on the compressor 22, in a way similar to that which was described regarding the device 46 and the compressor 28.

As in the case of the compressor 28, it should be noted that no control of the residual nitrogen pressure is implemented at the compressor 22. This pressure is therefore established spontaneously, particularly as a function of the characteristics of the gas turbine and of the compressor 22. Furthermore, no valve is needed on the line 24.

The flow rate of residual nitrogen flowing through the line 24 is therefore assigned a variable setpoint value that varies as a function of the flow rate of fuel gas, the latter flow rate being itself representative of the load on the turbine.

FIG. 2 illustrates an alternative form of embodiment of the invention.

This alternative form of embodiment differs from the installation of FIG. 1 in that the control device 46', similar to the one 46, acts not on the compressor 28 but on an injection valve 54 placed on the pipe 30. Furthermore, this pipe 30 is equipped with a device 56 acting on the compressor 28 with a view to controlling the oxygen pressure.

The installation of FIG. 2 also differs from that of figure 1 in that the device 52'for controlling the flow rate, similar to the one 52, acts not on the compressor 22 but on a valve 58 placed on the pipe 24. This pipe 24 is also equipped with a device 60 for controlling the residual nitrogen pressure, acting directly on the compressor 22.

The installation of FIG. 2 finally differs from that of FIG. 1 in that the gasifier 32 is provided with a device 62 for controlling the pressure inside this gasifier. This device 62 acts on a valve 64, with which the fuel gas pipe 38 is equipped.

The setpoints assigned to the various control devices 56, 60 and 62 have a variable value that varies as a function of the load on the gas turbine.

For this purpose a sensor 66 is used to measure the pressure in the air delivery circuit, which places the compressor 4 in communication with the combustion chamber 8. The setpoint values of the devices 56, 60 and 62 then correspond to the pressure value thus measured by the sensor 66, to which safety values AP are added. For this, these devices 56, 60 and 62 are connected to the sensor 66 by respective command lines allocated the references 68, 70 and 72.

By way of example, the setpoint valve for the control device 60 for controlling the residual nitrogen pressure corresponds to the pressure P measured by the sensor 66, to which a safety value $\Delta P1$ of between 0.1 and 10 bar, preferably between 0.3 and 2 bar is added.

The setpoint value for the device 56 for controlling the oxygen pressure corresponds to the value measured by the sensor 66, to which a safety value $\Delta P2$ of between 2 and 20 bar, preferably between 3 and 10 bar, is added.

Finally, the setpoint value for the device 62 for controlling the pressure of the gasifier corresponds to the value measured by the sensor 66, to which a safety value $\Delta P3$ of between 0.5 and 10 bar, preferably between 1 and 5 bar, is added.

The three setpoint values mentioned hereinabove can therefore vary as a function of the pressure in the delivery circuit, this pressure itself being representative of the load on the turbine. It is conceivable for these setpoint values to be varied, as a function of pressures at other points of the installation. Thus, a sensor, not depicted, similar to the one 66, may be provided in the combustion chamber 8.

The invention is not restricted to the examples described and depicted.

Thus, it is conceivable to control the flow rate of just one gaseous stream, namely the nitrogen or the oxygen, using the steps described with reference to FIG. 1. In this case, the pressure of the other gaseous stream may be controlled in accordance with the example described with reference to FIG. 2.

It is also possible to supply the combustion chamber 8 using a single gaseous stream originating from the air separation unit. Thus, only the residual nitrogen produced by this air separation unit may be used, the combustion gas being, for example, natural gas.

The invention makes it possible to achieve the aforesaid objectives.

Specifically, It has been found that the implementation according to the prior art entailed a particularly high power consumption. This is mainly due to the fact that the nitrogen and oxygen compressors placed downstream of the air separation unit are subject to constant setpoint values, as concerns their output pressure which has to remain constant, and likewise the gasifier.

Now, when the gas turbine is operating at reduced capacity, the pressure in the combustion chamber is appreciably lower. As a result, in the prior art calling upon constant setpoint values, there is very appreciable expansion of the nitrogen, of the oxygen and of the synthesized gas in the injection valves, thus leading to considerable wastage of energy.

By contrast, varying the pressure and/or the flow rate of the oxygen and/or the nitrogen as a function of the load on the turbine makes it possible to appreciably reduce the amount of expansion undergone by these gases.

In particular, controlling the flow rate of these gaseous streams makes it possible to get around the pressure drops inherent in the use of injection valves. Indeed, according to this embodiment of the invention, the aforesaid valves can be omitted, or alternatively may have no influence on the implementation of the installation because they are wide open.

It will be understood that many additional changes in the details, materials, steps, and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A method for producing energy using a gas turbine associated with an air separation unit, comprising:
   a) admitting air into said air separation unit,
   b) extracting at least one of an oxygen stream or a nitrogen stream from said air separation unit,
   c) compressing said oxygen stream with a first compressor, said first compressor being located downstream of said air separation unit,
   d) compressing said nitrogen stream with a second compressor, said second compressor being located downstream of said air separation unit, e) directing said oxygen stream toward a gasifier, f) directing said nitrogen stream toward a combustion chamber of said gas turbine, g) controlling at least one parameter associated with at least one of said oxygen stream or said nitrogen stream with said first compressor or said second compressor, wherein said at least one parameter is pressure, and h) assigning a first variable setpoint value that varies as a function of a value representative of the load on the gas turbine to said at least one parameter, wherein said value representative of the load on the turbine is a specific pressure value on the intake side of said gas turbine, wherein the pressure inside said gasifier is also controlled by assigning to it a second variable setpoint that varies as a function of said pressure value.

2. The method as claimed in claim 1, wherein said second variable setpoint value is equal to said pressure increased by a third safety value.

3. The method as claimed in claim 2, wherein said third safety value is between 0.5 and 10 bar.

4. The method as claimed in claim 3, wherein said third safety value is between 1 and 5 bar.

5. An apparatus for producing energy using a gas turbine associated with an air separation unit, comprising:

a) means for extracting at least one of an oxygen stream or a nitrogen stream from said air separation unit, b) a first compression means for compressing said oxygen stream, wherein said first compression means is located downstream of said air separation unit, c) a second compression means for compressing said nitrogen stream, wherein said second compression means is located downstream of said air separation unit, d) means for conveying said nitrogen stream toward a combustion chamber of said gas turbine, e) means for conveying said oxygen stream toward a gasifier, f) control means for controlling at least one parameter associated with at least one of said oxygen or nitrogen streams, wherein said control means acts directly on said first compression means or said second compression means, and wherein said control means has a variable setpoint value that varies as a function of a value representative of the load on said turbine, wherein said control means controls the pressure of said at least one of said oxygen or nitrogen streams, and g) measurement means for measuring the pressure on the inlet side of the gas turbine, wherein said measurement means controls the pressure of said gasifier.

* * * * *